United States Patent [19]
Taniguchi et al.

[11] Patent Number: 4,741,428
[45] Date of Patent: May 3, 1988

[54] SUPPLY HOPPER ASSEMBLY

[75] Inventors: Shin ichi Taniguchi, Osaka; Takashi Ohtsuki, Kawabe, both of Japan

[73] Assignee: Takeda Chemical Industries, Ltd., Osaka, Japan

[21] Appl. No.: 831,125

[22] Filed: Feb. 21, 1986

Related U.S. Application Data

[63] Continuation of Ser. No. 585,583, Mar. 2, 1984, abandoned.

[30] Foreign Application Priority Data

Mar. 4, 1983 [JP] Japan ................................ 58-36454

[51] Int. Cl.$^4$ .............................................. B65G 47/24
[52] U.S. Cl. ...................... 198/397; 198/453; 198/493; 198/533; 198/443; 221/200; 221/211
[58] Field of Search ............. 198/397, 453, 455, 493, 198/533, 443, 380, 393, 471.1, 803.5; 221/200, 211; 222/317

[56] References Cited

U.S. PATENT DOCUMENTS

| | | | |
|---|---|---|---|
| 1,437,863 | 12/1922 | Raymond | 222/317 |
| 3,889,591 | 6/1975 | Noguchi | 198/397 |
| 3,933,239 | 1/1976 | Yoshida | 198/397 |

Primary Examiner—Joseph E. Valenza
Attorney, Agent, or Firm—Wenderoth, Lind & Ponack

[57] ABSTRACT

A hopper assembly for use in a product transporting apparatus having a rotary drum having at least one circumferential row of equally spaced, radially inwardly recessed pockets for receiving therein products to be transported while they are sucked therein by the effect of negative pressure developed in the respective pockets as the rotary drum rotates in one direction. The hopper assembly has a container having a bottom plate inclined at a particular angle downwardly towards the periphery of the drum and terminating at a particular position, and a nozzle assembly for supplying jets of compressed air into the container for permitting the products to be upwardly moved thereby to facilitate the supply of the products successively into the respective pockets.

3 Claims, 7 Drawing Sheets

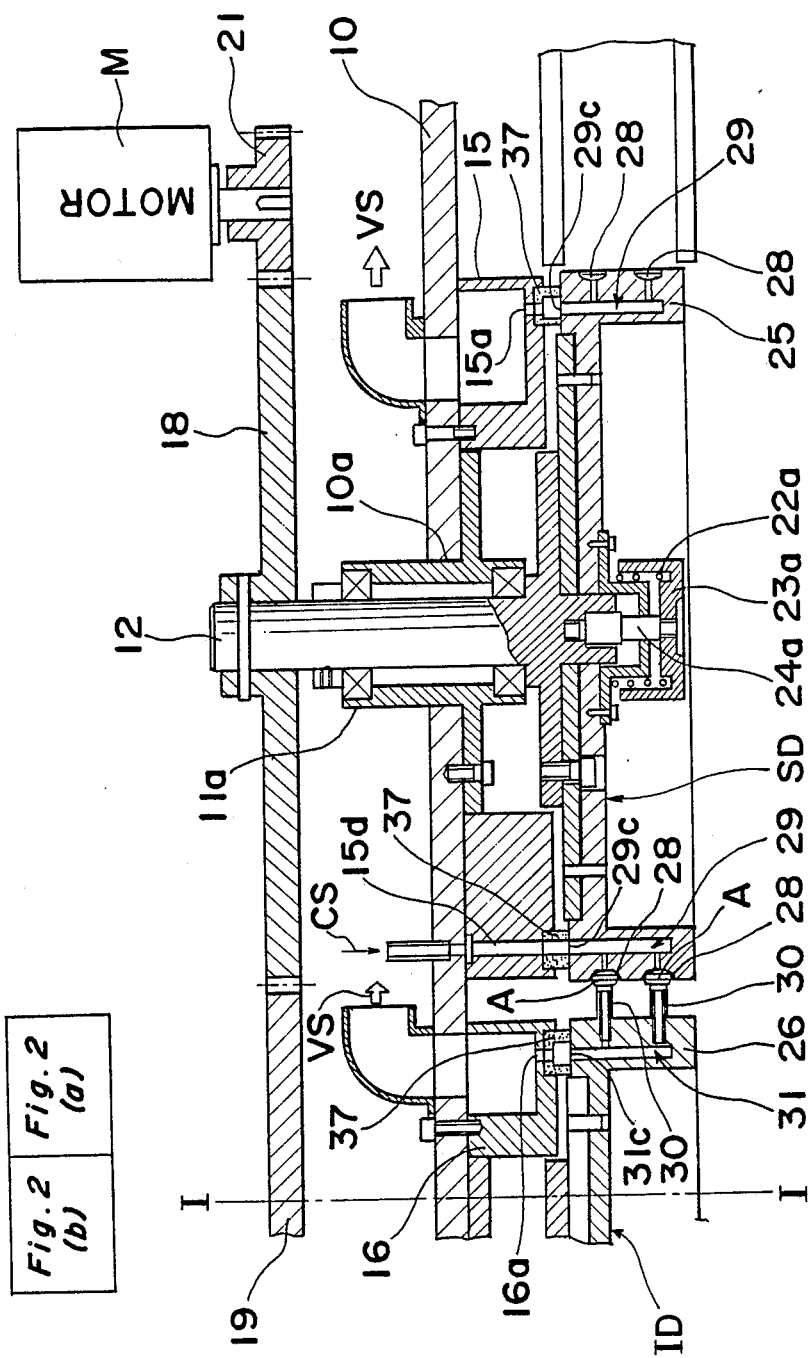

SUPPLY HOPPER ASSEMBLY

This application is a continuation, of now abandoned application Ser. No. 585,583, filed Mar. 2, 1984 aband.

BACKGROUND OF THE INVENTION

The present invention relates to a supply hopper assembly for use in a product transporting apparatus of a type capable of transporting products successively from one station to another while they are received in and retained by respective pockets on a rotary drum which are communicated with a source of vacuum.

There is known a product transporting apparatus which comprises at least one rotary drum supported for rotation in one direction and having in the peripheral surface at least one circumferential row of a plurality of radially inwardly recessed pockets, some of which successively receive therein a corresponding number of the products during each complete rotation of the drum for the transportion thereof from a take-in position towards a take-out position spaced angularly from each other around the rotary drum. The apparatus also comprises means for causing some of the pockets to be communicated with the vacuum source for enabling the products to be sucked into and received in the corresponding pockets, and means for causing the pockets to be successively communicated with a source of compressed air during the continued rotation of the rotary drum to enable the products so transported to be ejected onto a subsequent processing station at the take-out station.

An example of the above described apparatus is disclosed, for example, in U.S. Pat. No. 3,889,591, patented June 17, 1975, and U.S. Pat. No. 3,933,239, patented Jan. 20, 1976, both assigned to the assignee of the present invention.

In particular, U.S. Pat. No. 3,889,591 discloses the use of a hopper assembly positioned at the supply station for supplying the products onto the rotary drum. This known hopper assembly has a plurality of blow holes defined in the bottom plate, inclined downwardly towards the rotary drum, which blow holes are communicated with a compressed air source so that some of the products within the hopper assembly can be held in a fluidized state, and also comprises a rubber idle roller operable to ensure that each pocket receives an individual product therein from the hopper assembly.

It has, however, been found that the construction of the known hopper assembly is not satisfactory because of the fact that, when the rotary drum is rotated at a relatively high speed, the products tend to roll in contact with the periphery of the rotary drum being rotated, oftentimes failing to be received in the associated pockets then communicated with the vacuum source.

SUMMARY OF THE INVENTION

Accordingly, the present invention has been developed with a view to substantially eliminating the above described problem inherent in the prior art hopper assembly and has, for its essential object to provide an improved hopper assembly which is effective to cause the products to be successively sucked into and received in the associated pockets without fail.

To this end, according to the present invention, the hopper assembly comprises a container mounted adjacent the periphery of the rotary drum with a portion of said rotary drum accommodated therein, said container having a bottom plate for guiding the products towards the periphery of the rotary drum by the effect of their own weight, said bottom plate being inclined downwardly towards the rotary drum at an angle within the range of 25° to 45° relative to the horizontal plane passing through the axis of rotation of the rotary drum and terminating at a point on the arc which is defined by the central angle of −10° to 45°, preferably 0° to 45°, between the horizontal plane passing through the axis of rotation of the rotary drum and an imaginary line drawn on the trailing side of the horizontal plane with respect to the direction of rotation of the rotary drum so as to pass through the axis of rotation of the rotary drum at right angles thereto, and a nozzle assembly carried by the bottom plate for injecting jets of compressed air for forcibly floating the products within the container upwardly so as to permit each product to be sucked into and received in the respective pocket then communicated to the vacuum source.

BRIEF DESCRIPTION OF THE DRAWINGS

This and other objects and features of the present invention will become apparent from the following description taken in conjunction with a preferred embodiment thereof with reference to the accompanying drawings, in which.

DETAILED DESCRIPTION OF THE EMBODIMENT

Figure 1:
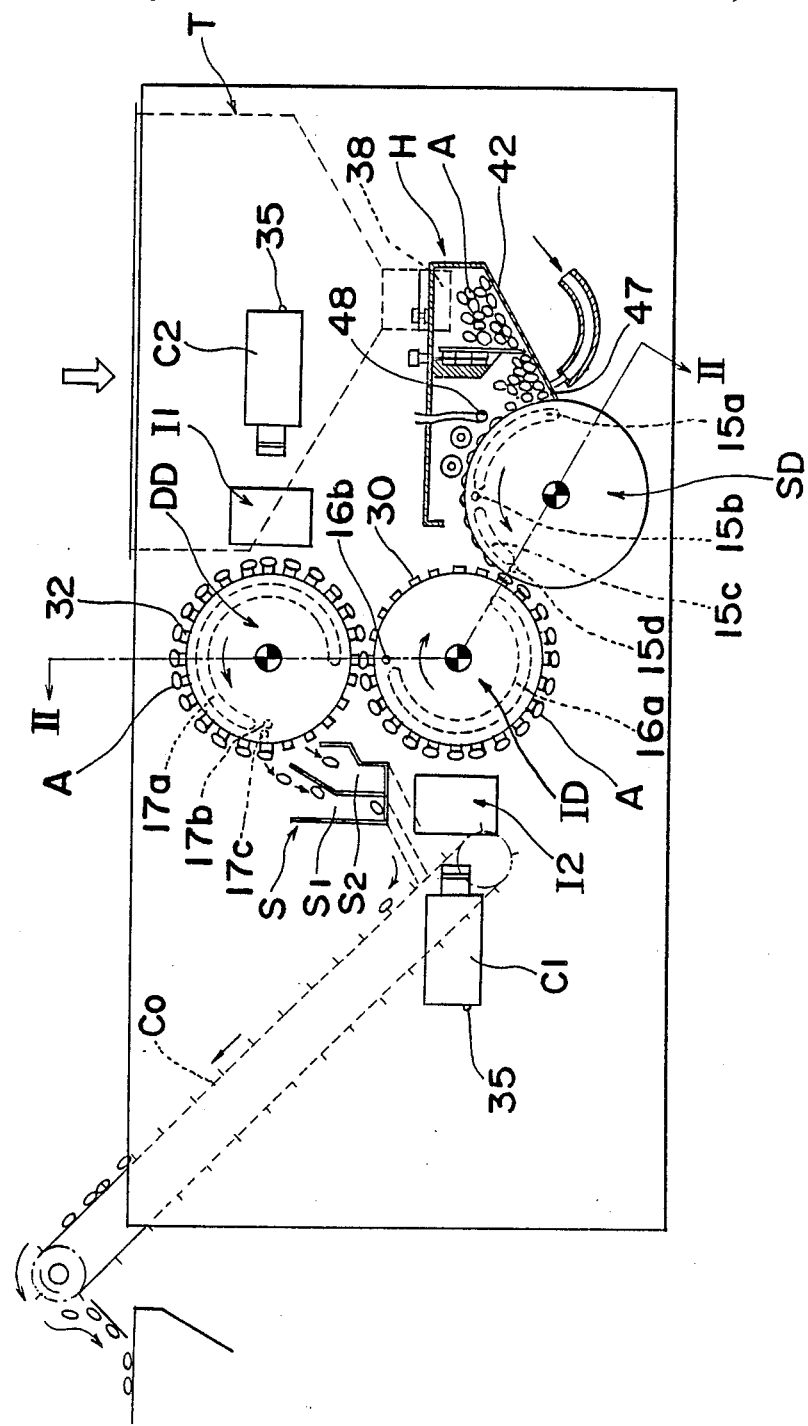
FIG. 1 is a schematic front view, with a portion broken away, of a product transporting apparatus utilizing a hopper assembly according to the present invention.

Before the description of the present invention proceeds, it is to be noted that like parts are designated by like reference numerals throughout the accompanying drawings.

Referring first to FIG. 1, there is schematically shown a product transporting apparatus for transporting successively solid products which are discrete elements of similar shape and/or size, i.e, which are substantially uniform, for example, tablets, pills or capsules, from a supply station to a sorting station past first and second inspecting stations. The apparatus shown therein includes a supply hopper assembly H, positioned at the supply station and adapted to receive therein a mass of products A, a supply drum SD rotatable in one direction, for example, in a counterclockwise direction as shown by the arrow for transporting the products A from the supply station toward a first transfer position, an intermediate drum ID rotatable in a clockwise direction for transporting the products A, which have been transferred one by one thereto from the supply drum SD at the first transfer position, successively toward a second transfer position past a first inspecting station where a first television camera C1 is installed adjacent the drum ID, and a delivery drum DD rotatable in a counterclockwise direction for transporting the products A, which have been transferred one by one thereto from the intermediate drum ID at the second transfer position, successively toward the sorting station past a second inspecting station where a second television camera C2 is installed adjacent the drum DD.

The charging of the products to be inspected into the supply hopper assembly H may be done in any suitable manner, for example, by dropping them from a relay conveyor. However, as shown, a batch tank T is shown as utilized to supply the products by gravity into the hopper assembly H.

At the sorting station, there is disposed a sorter box S having two chambers S1 and S2 for receiving good and rejected products, respectively, which have been transported to the sorting station by means of the delivery drum DD in a manner as will be described later. The good products which have been ejected one by one into the chamber S1 of the sorter box S are then transported by a conveyor Co toward the subsequent processing station, for example, a packaging machine, while the rejected goods ejected one by one into the chamber S2 of the sorter box S are recovered in a suitable container directly or by means of a conveyor.

Disposed between the drums ID and DD and the associated television cameras C1 and C2 are illuminator units I1 and I2 for illuminating the products being transported by the respective drums ID and DD.

It will be readily understood that the product transporting apparatus forms a part of the product inspecting machine, it being, however, noted that the apparatus need not be always limited in application to the inspecting machine, but may be utilized as a part of a branding machine for printing indicia on the products such as disclosed in U.S. Pat. No. 3,889,591.

Figure 2B:
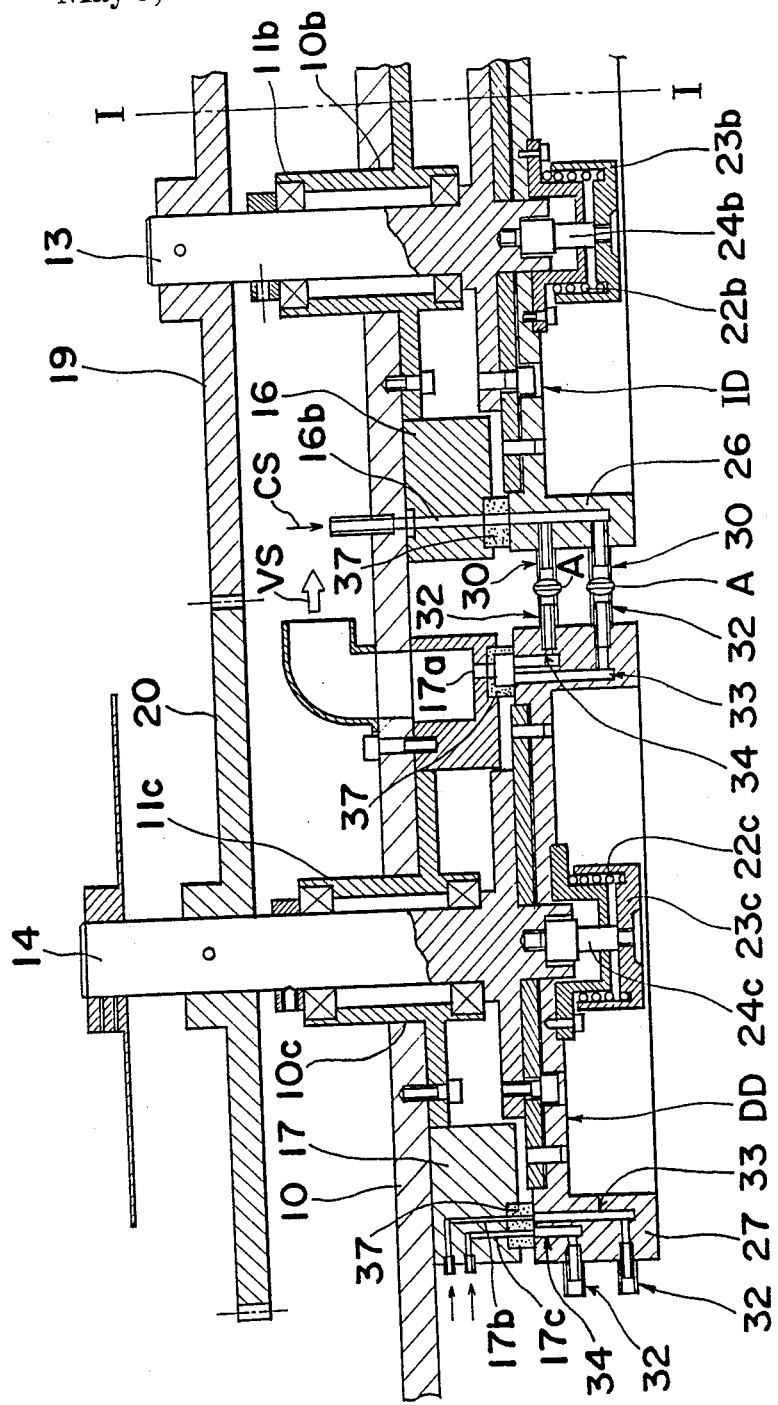
FIG. 2, comprised of FIGS. 2(a) and 2(b), is a cross-sectional view taken along the line II—II in FIG. 1.

Referring now to FIG. 2 which illustrates the product transporting apparatus in its entirety when FIGS. 2(a) and 2(b) are brought together with the chain line I-I in FIG. 2(a) exactly superposed upon that of FIG. 2(b), the apparatus comprises a common upright support plate 10 having three bores 10a, 10b and 10c defined therein, the bore 10a being positioned generally laterally of the bore 10b while the bore 10c is positioned above the bore 10b as viewed in FIG. 1. The support plate 10 carries bearing sleeves 11a, 11b and 11c rigidly flanged thereto and extending through the bores 10a, 10b and 10c for the support of shafts 12, 13 and 14, respectively, on which the associated drums SD, ID and DD are mounted for rotation together therewith.

Ring members 15, 16 and 17, generally equal in outer diameter to the drums SD, ID and DD, are rigidly secured to the support plate 10 in coaxial relation to the respective bores 10a, 10b and 10c and protrude towards the associated drums SD, ID and DD at right angles to the support plate 10, the function of each of said ring members 15 to 17 being described later.

On one side of the support plate 10 opposite to the drums SD, ID and DD, gear wheels 18, 19 and 20 are rigidly mounted on the respective shafts 12, 13 and 14 for rotation together therewith, the gear wheel 20 being drivingly meshed with the gear wheel 19 which is in turn drivingly meshed with the gear wheel 18 drivingly meshed with a drive gear 21 on a drive shaft of an electric motor M. Thus, it will be readily be seen that, while the motor M is being driven, the drums SD and DD are rotated in the same direction, i.e., the counterclockwise direction as viewed in FIG. 1, and the drum ID is rotated in a direction counter to the direction of rotation the drums SD and DD, i.e., the clockwise direction as viewed in FIG. 1.

The drums SD, ID and DD so mounted on the associated shafts 12, 13 and 14 are resiliently urged by compression springs 22a, 22b and 22c, respectively, in a direction towards a support plate 10 for the purpose which will become clear from the subsequent description. As is well known to those skilled in the art, the nonrotatable, but axially slidably mounting of each of the drums SD, ID and DD on the associated shaft 12, 13 or 14 can be accomplished by the employment of, for example, a splined engagement or a key-and-groove engagement, and therefore, the respective drum SD, ID and DD can be so urged by the associated compression spring 22a, 22b and 22c which is interposed between the respective drum and a cap member 23a, 23b and 23c axially displaceably secured to the associated shaft 12, 13 and 14 by means of a respective bolt member 24a, 24b and 24c.

Each of the drums SD, ID and DD has a construction having a respective cylindrical wall 25, 26 or 27 coaxial with the associated shaft 13, 14 or 15, and one of the opposite annular end faces of the respective cylindrical wall 25, 26 or 27 confronting the support plate 10 is held substantially in sliding contact with the associated ring members 15, 16 or 17 in a manner, as will become clear from the subsequent description, because the respective drum is urged by the associated compression spring 22a, 22b or 22c in the manner as hereinbefore described.

Figure 6:
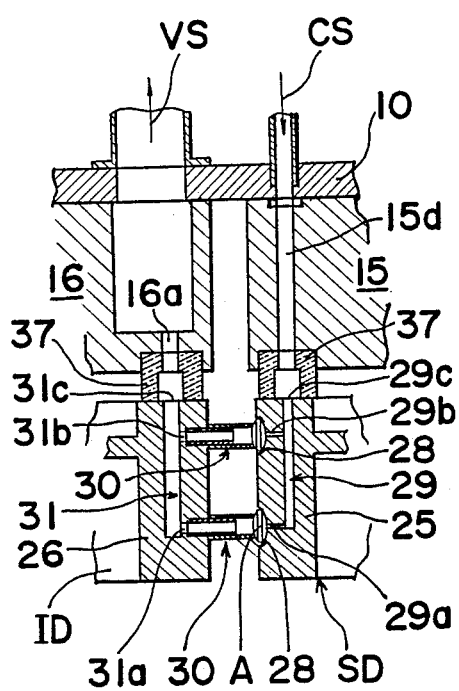
FIGS. 6 and 7 are sectional views, on an enlarged scale, showing the transfer of the products from the supply drum and the intermediate drum at the first transfer station and from the intermediate drum to the delivery drum at the second transfer station, respectively.
Figure 7:
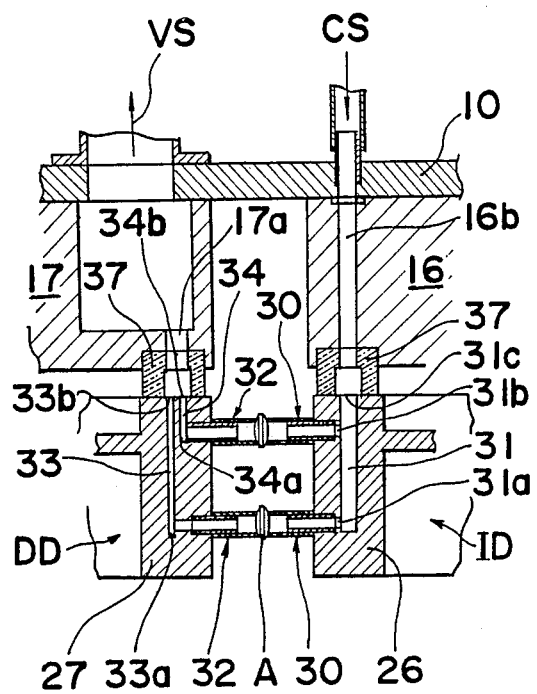

Referring to FIG. 2, particularly to FIGS. 2(a), and FIG. 6, the supply drum SD has circumferentially extending outer and inner rows of radially inwardly recessed pockets 28 which are defined in the outer peripheral surface of the cylindrical wall 25 in circumferentially equally spaced relation to each other. The cylindrical wall 25 has formed therein generally F-shaped passages 29 equal in number to the pockets 28 in one circumferential row and having first, second and third open ends 29a, 29b or 29c which open at the bottoms of the pockets 28 in the outer row, the bottoms of the pockets in the inner row and the annular end face of the cylindrical wall 25 adjacent the ring member 15, it being understood that the open ends 29c of all of the passages 29 are arranged in a circle concentric with the axis of rotation of the supply drum SD.

Figure 3:
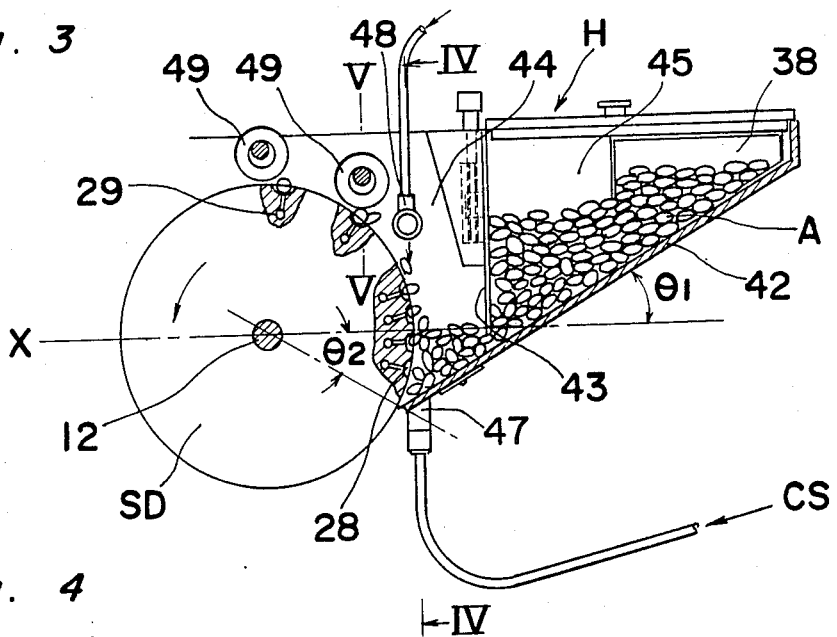
FIG. 3 is a sectional view, on an enlarged scale, showing the details of the hopper assembly.
Figure 4:
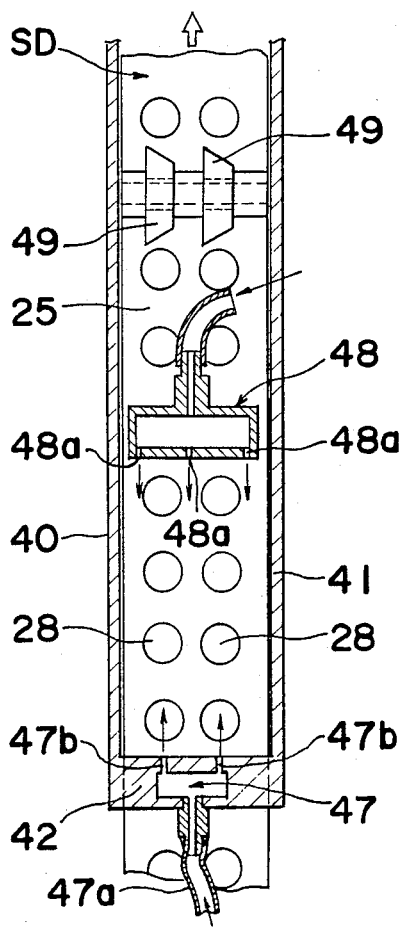
FIG. 4 is a cross-sectional view, on an enlarged scale, taken along the line IV—IV in FIG. 3.

These F-shaped passages 29 are, during each complete rotation of the supply drum SD, selectively communicated with a source of vacuum VS and a source of compressed air CS. For this purpose, as shown in FIGS. 1, 2(a) and 3, the ring member 15 fast with the support plate 10 has formed therein first, second, third and fourth slots 15a, 15b, 15c and 15d in alignment with the path of travel of, and in a position communicateable with, the third open ends 29c of the respective passages 29. The first and third slots 15a and 15c are in turn fluid-connected to the vacuum source VS through openings in the support plate 10, whereas the second and fourth slots 15b and 15d are in turn fluid-connected to the compressed air source CS through openings in the support plate 10. Thus, it will readily be seen that, during each complete rotation of the supply drum SD, each of the pockets 28 is sequentially communicated with the vacuum source VS to receive the respective product from the hopper assembly H; with the compressed air source CS to effect centering of the product thus received in the respective pocket 28, i.e., to accurately position the received product within the respective pocket 28; with the vacuum source VS to hold the product in position within the respective pockets 28 after the centering; and finally again with the compressed air source CS to blow the product for the transfer onto the intermediate drum ID. It is to be noted that, although the slot 15b is not always essential in the practice of the present invention, it should, if it is employed, be positioned immediately above the axis of rotation of the supply drum SD and that the slot 15d is to be positioned at the first transfer position.

Similarly, the intermediate drum ID has circumferentially extending outer and inner rows of tubular receptacles 30 which protrude an equal distance radially outwardly from the outer peripheral surface of the cylindrical wall 26 and are circumferentially equally spaced from each other, the outer and inner rows of said tubular receptacles 30 being spaced from each other a distance equal to the distance of spacing between the outer and inner rows of the pockets 28 in the supply drum SD. As is the case with the cylindrical wall 25 of the supply drum SD, the cylindrical wall 26 has formed therein generally F-shaped passages 31 equal in number to the receptacles 30 in one circumferential row and having first, second and third open ends 31a, 31b and 31c which open in communication with the receptacles 30 in the outer row, in communication with the receptacles 30 in the inner row, and at the annular end face of the cylindrical wall 26 adjacent the ring member 16, it being understood that the third open ends 31c of all of the passages 31 are arranged in a circle concentric with the axis of rotation of the intermediate drum ID.

As shown in FIGS. 1, 2, 6 and 7, these F-shaped passages 31 are, during each complete rotation of the intermediate drum ID, selectively communicated with the vacuum source VS and the compressed air source CS and, for this purpose, the ring member 16 has formed therein first and second slots 16a and 16b in alignment with the path of travel of, and in a position communicateable with, the third open ends 31c of the respective passages 31. The first and second slots 16a and 16b are in turn fluid-connected to the vacuum source VS and the compressed air source CS through openings in the support plate 10, respectively. Thus, it will readily be seen that, during each complete rotation of the intermediate drum ID, each of the tubular receptacles 30 is sequentially communicated with the vacuum source Vs to receive the respective product from the supply drum SD at the first transfer position and with the compressed air source to blow the product, which has been transported from the first transfer position in the form as sucked into the respective tubular receptacle 30, for the transfer onto the delivery drum DD at the second transfer position. During the transportation of the products successively from the first transfer position towards the second transfer position in the manner described above, they are successively brought into the field of view of the first television camera C1 for the detection of the presence or absence of flaws on one surface of each product thus inspected.

Referring to FIGS. 1, 2(b), 6 and 8, the delivery drum DD is similar in structure to the intermediate drum ID except for the difference that, instead of the F-shaped passages 31 defined in the cylindrical wall 26 of the intermediate drum ID, separate passages 33 and 34 of generally L-shaped configuration are employed for the outer and inner rows of tubular receptacles 32 that protrude an equal distance radially outwardly from the outer peripheral surface of the cylindrical wall 27 of the delivery drum DD. The passages 33 have their first open ends 33a in communication with the inner row of the tubular receptacles 32 and their second open ends 33b open at the annular end face of the cylindrical wall 27 adjacent the ring member 17, whereas the passages 34 have their open ends 34a in communication with the outer row of the tubular receptacles 32 and their second open ends 34b open at the annular end face of the cylindrical wall 27 at respective locations radially outwardly of the circle depicted by the second open ends 33b of the passages 33.

Figure 8:
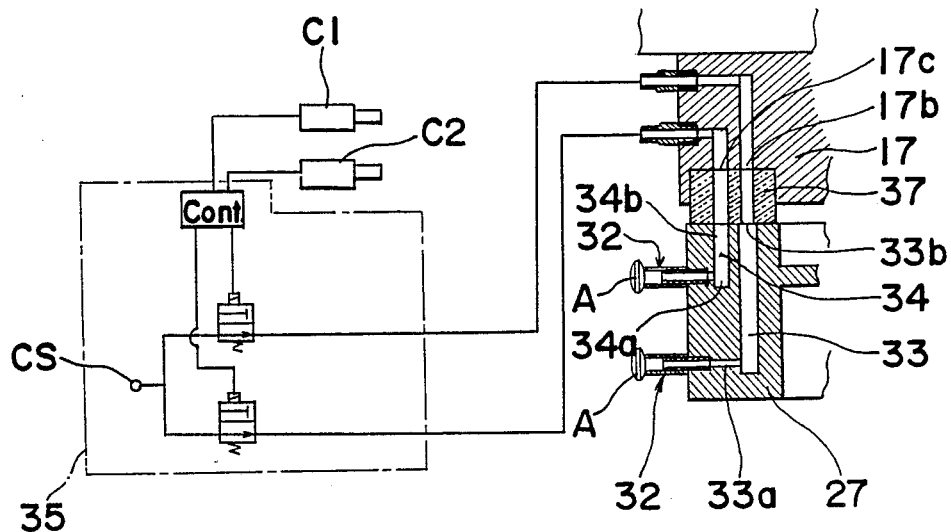
FIG. 8 is a sectional view, on an enlarged scale, showing the manner by which the products are sorted at the sorting station, together with a fluid circuit.
Figure 9:
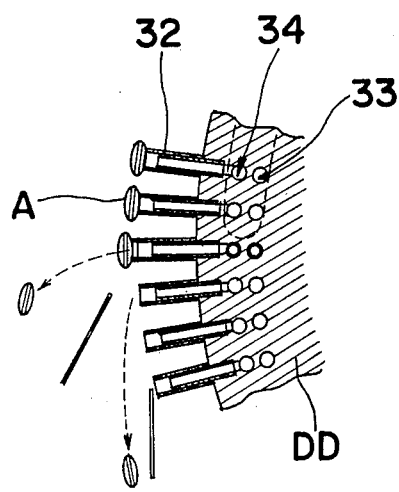
FIGS. 9 to 11 are sectional views, on an enlarged scale, showing the ejection of the products from the delivery drum at the sorting station.
Figure 10:
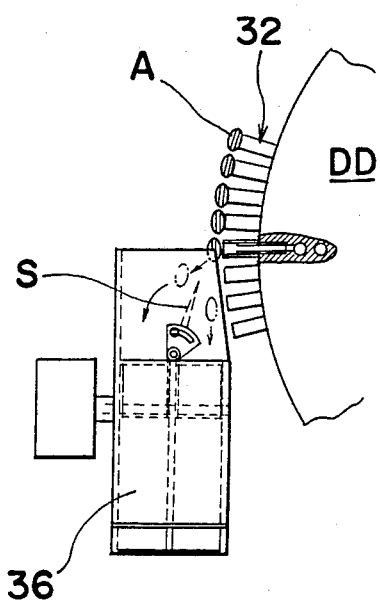
Figure 11:
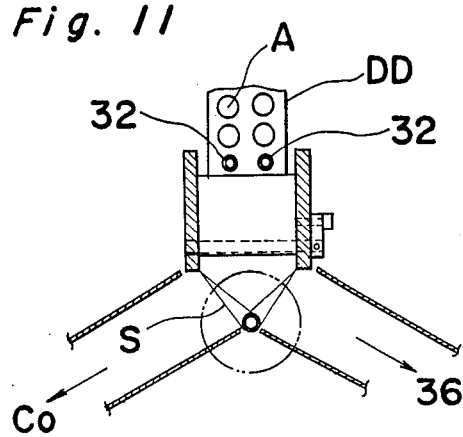

The ring member 17 associated with the delivery drum DD has formed therein a common slot 17a, which is in turn fluid-connected to the vacuum source VS through an opening in the support plate 10, and also with a pair of radially spaced openings 17b and 17c adapted to be selectively fluid-connected to the compressed air source CS one at a time in a manner as will be described later with particular reference to FIG. 8. It is to be noted that the common slot 17a has a width sufficient to cover both of the second open ends 33b and 34b of the respective passages 33 and 34 in the delivery drum DD, and that the openings 17b and 17c are so located as to align with any one of the second open ends 33b of the passages 33 and any one of the second open ends 34b of the passages 34, respectively. Thus, it will readily be seen that both of the outer and inner rows of the receptacles 32 are communicated with the vacuum source VS to receive the products successively from the intermediate drum ID at the second transfer position and then to retain them until, as a result of the rotation of the delivery drum DD, they approach the sorting station at which, assuming that all of the products so transported have been determined to be free from any flaw, the passages 33 and 34 are communicated with the compressed air source CS to blow the products off the associated tubular receptacles 32 onto the sorter box S. During the transportation of the products successively from the second transfer position towards the sorting station in the manner described above, they are successively brought into the field of view of the second television camera C2 for the detection of the presence or absence of flaws on the surface of each product which is opposite to the surface thereof inspected by the first television camera C1.

Referring now to FIGS. 8 to 11, the first and second television cameras C1 and C2 are operable to determine the presence or absence of flaws on the opposite surfaces of each of the products A being transported past the first and second inspecting stations, respectively, and to generate signals indicative of the respective results of the determination to a control 35 so that only the products A determined to be free from any flaws can be ejected onto the conveyor Co through the sorter box S. The products determined as having even the slightest flaw, that is, the rejected products, can be ejected onto the recovery container 36 through the sorter box S. The recovery container 36 is also used to recover all of the products A remaining on some or all of the drums SD, ID and DD when the supply of the products to be inspected into the hopper assembly H is interrupted.

The sorting of the acceptable and rejected products is carried out in such a manner that, when the product carried by one of the tubular receptacles 32 on the delivery drum DD is determined to be a rejected product by the control 35, the passage fluid-connected with said one of the receptacles 32 is disconnected from the vacuum source VS to allow the product, then retained by said one of the receptacles 32, to fall by gravity onto the recovery container 36, but when the product carried by one of the receptacles 32 is determined to be an acceptable product by the control 35, the passage fluid-connected with said one of the receptacles 32 is switched from the vacuum source VS over to the compressed air source CS to cause such acceptable product to be blown onto the conveyor Co.

In the construction so far described, the product transporting apparatus operates in the following manner. Assuming that the drums SD, ID and DD are driven by the motor M in synchronism with each other, some products A within the hopper assembly H are successively sucked into and received in the pockets 28 on the supply drum SD then communicated with the vacuum source VS. As each of the pockets 28 carrying the products A therein approaches the top position immediately above the shaft 12, the pockets 28 are successively communicated with the compressed air source CS through the second slot 15b while the communication thereof with the vacuum source VS is immediately interrupted. Upon communication between each pocket 28 and the compressed air source CS, the respective product received in such pocket 28 is floated in air for the centering thereof relative to such pocket 28. Immediately after the centering, the associated pocket 28 becomes disconnected from the compressed air source CS and communicated again with the vacuum source VS through the third slot 15c whereby the product once floated in air is immediately seated in such pocket 28 until it arrives at the first transfer position.

Subsequent communication between each pocket 28 and the compressed air source CS through the slot 15d permits the corresponding product to be fed onto one of the tubular receptacles 30 on the intermediate drum ID which is then communicated with the vacuum source VS through the slot 16a. In this way the products transported by the supply drum SD from the supply station to the first transfer position are successively transferred onto the corresponding tubular receptacles 30 on the intermediate drum ID.

The products A so transferred onto the intermediate drum ID are then transported towards the second transfer position while sucked into and retained by the corresponding tubular receptacles 30 then communicated with the vacuum source VS through the slot 16a. Upon arrival at the second transfer position, the products are successively transferred from the corresponding tubular receptacles 30, then communicated with the compressed air source CS through the slot 16b, onto the corresponding tubular receptacles 32 on the delivery drum DD which are then communicated with the vacuum source VS through the common slot 17a. The products transferred successively onto the corresponding tubular receptacles 32 on the delivery drum DD are sucked into and retained by such corresponding receptacles 32 until they arrive at the sorting station at which the tubular receptacles 32 are communicated selectively with one of the vacuum and compressed air sources VS and CS depending on the respective results of the detection performed by the first and second television cameras C1 and C2 as hereinbefore described.

In practice, as best shown in FIGS. 2 and 6 to 8, the surface of each of the ring members 15 to 17 which the annular end face of the cylindrical wall of the respective drum SD, ID or DD contacts slidingly during the rotation of such drum is provided with seal members generally identified by 37, each being made of a synthetic material of low coefficient of friction and being arranged so as to surround the respective slot in the associated ring member.

Figure 12A:
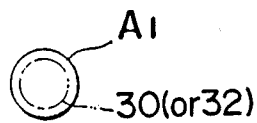
FIGS. 12(a) to 12(h) are top plan views showing various types of the products with which the apparatus can operate.
Figure 13A:
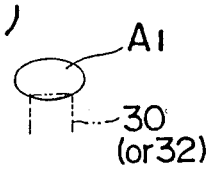
FIGS. 13(a) to 13(h) are side views of the various types of the products shown in FIGS. 13(a) to 12(h), respectively.
Figure 12B:
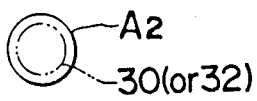
Figure 13B:
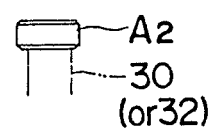
Figure 12C:
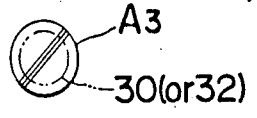
Figure 13C:
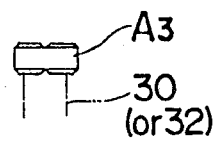
Figure 12D:
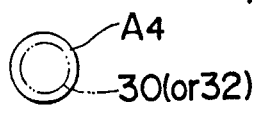
Figure 13D:
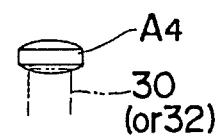
Figure 12E:
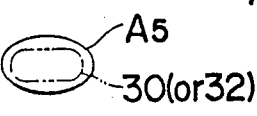
Figure 13E:
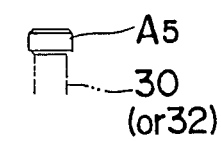
Figure 12F:
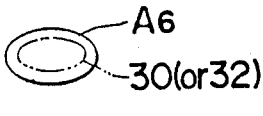
Figure 13F:
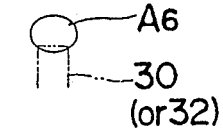
Figure 12G:
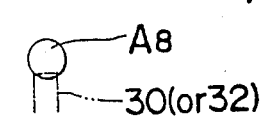
Figure 13G:
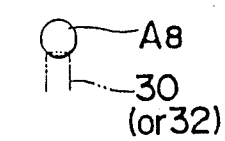
Figure 12H:
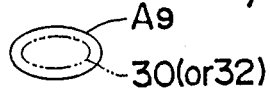
Figure 13H:
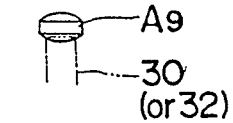

In addition, the products A with which the transporting apparatus can handle include, among other products, sugar coated discord-shaped tablets such as shown at A1 in FIGS. 12(a) and 13(a); film-coated tablets such as shown at A2, A4, A5 and A9 in FIGS. 12(b) and 13(b), FIGS. 12(d) and 13(d), FIGS. 12(e) and 13(e) and FIGS. 12(h) and 13(h), respectively; bare tablets such as shown at A5 in FIGS. 12(e) and 13(e); ellipsoidal tablets such as shown at A6 in FIGS. 12(f) and 13(f); and pills such as shown at A8 in FIGS. 12(g) and 13(g). Accordingly, each of the pockets defined in the wall 25 of the supply drum SD must have, a shape sufficient and necessary to accommodate the product of a particular shape.

The details of the hopper assembly H embodying the present invention will now be described with particular reference to FIGS. 1, 3, 4 and 5.

The batch tank T is secured to the support plate 10 at a location on one side thereof opposite to the drums SD, ID and DD while the hopper assembly H is located on the other side of the support plate 10 adjacent the supply drum SD. A mass of the products charged into the batch tank T can be supplied by gravity into the hopper assembly H through a window 38 defined in the support plate 10. The level of the mass of the products A within the hopper assembly H can be automatically controlled to a predetermined value as a result of the formation of bridging of some of the products between the exit of the batch tank T and the hopper assembly H, which bridging will take place when a predetermined amount of the products A has been supplied into the hopper assembly H.

The hopper assembly H comprises a pair of generally triangular side plates 40 and 41 spaced from each other a distance corresponding to the length of the cylindrical wall 25 of the supply drum SD, and an inclined bottom plate 42, the interior of said hopper assembly H being divided by a damper plate 43 into first and second compartments 44 and 45 adjacent to and remote from the outer periphery of the supply drum SD, respectively. As best shown in FIG. 3, the bottom plate 42 is downwardly inclined towards the outer periphery of the supply drum SD at an angle within the range of 25° to 45°, preferably 30°, relative to the horizontal plane X passing through the axis of rotation of the drum SD at right angles thereto, with its lower end terminating in the vicinity of the outer peripheral surface of the cylindrical wall 25. The lower end of the bottom plate 42 should be spaced the slightest possible distance from the outer peripheral surface of the cylindrical wall 25 so as to avoid any possible creep of some products downwardly through the clearance therebetween.

The hopper assembly H includes an air nozzle assembly 47 provided at a portion of the bottom plate 42 adjacent its lower end for supplying jets of air from below into the first compartment 44 of the hopper assembly H, and another air nozzle assembly 48 supported from above and positioned within the first compartment 44.

Because of the reason described later, in addition to the bottom plate 42 being inclined at the angle $\theta1$ of 25° to 45° as hereinbefore described, it is desirable to make the lower end of the bottom plate 42 terminate in the vicinity of the outer peripheral surface of the drum SD at any position on the arc which is defined by the central angle $\theta2$ of 0° to 45° between the horizontal plane X and the imaginary line drawn on the trailing side with respect to the direction of rotation of the drum SD and passing through the axis of rotation of the drum SD at right angles thereto. It is to be noted that, if the angle $\theta1$ of inclination of the bottom plate 42 is smaller than 25°, the products A within the supply hopper assembly H will no longer fall by gravity along the bottom plate 42, but if it is greater than 45°, the bottom plate 42 will extend downward in a direction departing from the tangential direction relative to the outer periphery of the drum SD and will eventually extend beneath the drum SD with the products A within the hopper assembly H being permitted to creep in beneath the drum SD. It is also to be noted that, if the lower end of the bottom plate 42 is located in the vicinity of the outer peripheral surface of the cylindrical wall 25, but at a position above the horizontal plane X, the products within the hopper assembly H tend to readily ride on the drum to seat in the respective pockets 28 and the interruption of the supply of the products can no longer be controlled. On the other hand, if the lower end of the bottom plate 42 is located at a position departing from the central angle $\theta2$ and on the trailing side of the drum SD relative to the horizontal plane X, the lower end of the bottom plate 42 will be positioned away from the tangential point on the drum SD.

Thus, from the foregoing, it is clear that the angle $\theta1$ of inclination is preferred to be within the range of 25° to 45° and the central angel $\theta2$ within the range of $-10°$ to 45°, preferably 0° to 45°.

The flow of the products A from the second compartment 45 into the first compartment 44 can be controlled by adjusting the opening of the damper 43 in such a way as to permit the products A within the second compartment 45 to flow into the first compartment 44 at a rate sufficient to substantially compensate for reduction of the products A within the first compartment 44 as a result of the transportation by the supply drum SD.

It may happen that, when the supply drum SD as well as the other drums ID and DD is rotated at a speed higher than a predetermined speed, for example, at 22.5 rpm, the follow-up characteristic of the solid products A relative to the movement of the pockets 28 will be adversely affected and, at the worst it may happen that the solid products A within the first compartment 44 will not be successfully sucked successively into the corresponding pockets 28. This problem can be avoided by the provision of the air nozzle assembly 47. This air nozzle assembly 47 has an inlet communicated through a tubing 47a with a source of compressed air (not shown) capable of supplying compressed air under a predetermined pressure, for example, 1.5 to 2.5 kg/cm$^2$, and a plurality of, preferably two, discharge ports 47b oriented upwards into the first compartment 44. The nozzle assembly 47 of the above described construction is operable to apply jets of compressed air from the discharge ports 47b into the first compartment 44 to blow up the products resting on the bottom plate 42 generally in the same direction as the direction of rotation of the supply drum SD so as to permit the products to move upwards within the first compartment at a speed generally conforming to the peripheral velocity of the drum SD, they can be readily and efficiently sucked into the corresponding pockets 28 then communicated with the vacuum source VS as hereinbefore described.

Thus, with the arrangement according to the present invention, even when the drum SD is rotated at a relatively high speed, the products A within the first compartment 44 of the hopper assembly H can be successively sucked into and received in the respective pockets 28 on the drum SD. By way of example, it is possible to cause the apparatus to handle 100,000 to 300,000 pieces of tablets per hour (about 30 to 60 pieces per second). In addition, where the supply of the solid products onto the supply drum SD is desired to be interrupted, the supply of the air jets from the nozzle assembly into the first compartment 44 and the communication between the pockets 28 and the vacuum source VS are to be interrupted substantially simultaneously. In such case, no product will be transported by the supply drum SD even through the latter continues to rotate at a relatively high speed, and therefore a remote control of the initiation and supply of the products onto the drum SD can readily be accomplished if desired. It is, however, to be noted that the number of the discharge ports 47b of the nozzle assembly 47 depends on the number of the circumferential rows of the pockets 28 and is preferably equal thereto.

The nozzle assembly 48 positioned on the leading side relative to the nozzle assembly 47 is utilized to blow off some of the products which have not been received in the respective pockets 28, but riding on portions of the outer peripheral surface of the cylindrical wall 25 around the products received in the pockets 28. For this purpose, the nozzle assembly 48 communicated with a separate source of compressed air supplies jets of air of, for example, 0.2 to 0.8 kg/cm$^2$ through its discharge ports 48a oriented downwards. Preferably, the nozzle assembly 48 is so designed and so positioned as to permit the jets of air emerging from the respective discharge ports 48a to flow between the side wall 40 and the outer row of the pockets 28, between the outer and inner rows of the pockets 28, and between the inner row of the pockets 28 and the side wall 41, respectively, as shown by the arrow headed lines in FIG. 4.

Figure 5:
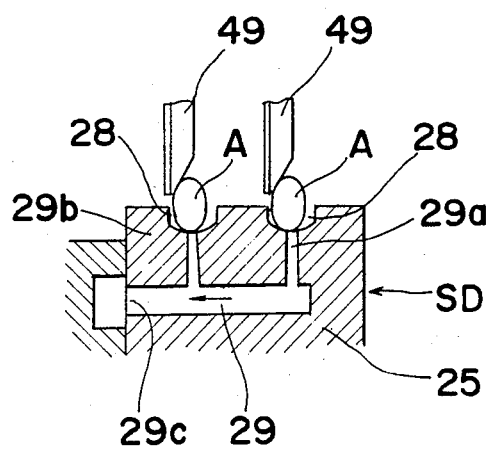
FIG. 5 is a cross-sectional view, on an enlarged scale, taken along the line V—V in FIG. 3.

The hopper assembly H also includes rubber rollers 49 supported far free eccentrical rotation at a location on the leading side relative to the nozzle assembly 48 with respect to the direction of rotation of the supply drum SD. These rubber rollers 49 serve to engage some of the products being transported, which have been received in the respective pockets 28 in the wrong position as best shown in FIG. 5, and to impose their own weight on the wrongly positioned products so as to lay them down into the correct position.

It is to be noted that the compressed air emerging from the slot 15b (FIG. 1) for the purpose of adjusting the position of the product A relative to the respective pocket 28 in which it has been received is preferably at a pressure of, for example, 0.05 to 0.1 kg/cm², sufficient to shape the product within the respective pocket 28 without being unduly carried away in air.

Although the present invention has been fully described in connection with the preferred embodiment thereof with reference to the accompanying drawings, it is to be noted that various changes and modifications are apparent to those skilled in the art. By way of example, the product transporting apparatus to which the hopper assembly according to the present invention is coupled may not be the one shown and described, but may comprise at least the supply drum SD.

Moreover, the number of the circumferential rows of the pockets 28 on the supply drum may also not always be limited to two, but may be one or three or more. This also equally applies to the number of the circumferential rows of the tubular receptacles on each of the intermediate and delivery drums, which must be equal to the number of the circumferential rows of the pockets on the supply drum SD.

Accordingly such changes and modifications are to be construed as included within the scope of the present invention as defined by the appended claims unless they depart therefrom.

We claim:

1. A hopper and drum assembly for use in a tablet transporting apparatus for transporting substantially uniform tablets, said assembly comprising at least one rotary drum having the periphery formed with a plurality of radially inwardly recessed pockets having a size for receiving only a single tablet and arranged in at least one circumferentially extending row in equally spaced relation to each other, each of which pockets is, during each complete rotation of said drum, sequentially communicated with a vacuum source to receive a tablet from the hopper assembly and with a source of compressed air to blow the tablet off the respective pocket onto a subsequent process; a container mounted adjacent the periphery of the rotary drum with a portion of said rotary drum accommodated therein, said container having a bottom plate for guiding the tablets towards the perihery of the rotary drum by the effect of their own weight, said bottom plate being inclined downwardly towards the rotary drum at an angle within the range of 25° to 45° relative to a horizontal plane passing through the axis of rotation of the rotary drum and terminating at a point on the arc which is defined by the central angle of 0° to 45° between horizontal plane passing through the axis of rotation of the rotary drum and an imaginary line drawn between the axis of rotation of the rotary drum and the terminating point of said bottom plate, the arc extending along the rotary drum opposite the direction of rotation of the drum, and an adjustable damper plate dividing the interior of said container into first and second compartments adjacent to and remote from the outer periphery of the drum, respectively, and terminating at a level above said bottom plate, a nozzle assembly carried by the bottom plate for injecting jets of compressed air; and means for supplying compressed air to said nozzle assembly at a pressure for causing the tablets within the container to be moved upwardly within the first compartment at a speed corresponding to the velocity of the peripheral surface of the rotary drum so as to permit each tablet to be sucked into and received in the respective pocket then communicated to the vacuum source.

2. An assembly as claimed in claim 1, further comprising a second nozzle assembly for injecting jets of compressed air downwardly within the container for removing some products carried by the rotary drum without being received in the respective pockets.

3. An assembly as claimed in claim 1, further comprising at least one rubber roller disposed adjacent the periphery of the rotary drum for free eccentric movement for the engagement of any one of the products being transported by the drum, but held in the wrong position within the associated pocket.

* * * * *